US007258368B2

(12) United States Patent
Franko, Sr.

(10) Patent No.: US 7,258,368 B2

(45) Date of Patent: *Aug. 21, 2007

(54) EXTENDED TEXT WRAP LABEL AND METHOD OF MANUFACTURE THEREOF

(75) Inventor: Joseph D. Franko, Sr., Ham Lake, MN (US)

(73) Assignee: Quality Assured Enterprises, Inc., Hopkins, MN (US)

( * ) Notice: Subject to any disclaimer, the term of this patent is extended or adjusted under 35 U.S.C. 154(b) by 481 days.

This patent is subject to a terminal disclaimer.

(21) Appl. No.: 10/840,517

(22) Filed: May 6, 2004

(65) Prior Publication Data

US 2004/0207193 A1 Oct. 21, 2004

Related U.S. Application Data

(63) Continuation-in-part of application No. 09/927,989, filed on Aug. 10, 2001, now Pat. No. 6,755,442.

(51) Int. Cl.

*B24D 15/00* (2006.01)
*B32B 9/00* (2006.01)
*B32B 33/00* (2006.01)

(52) U.S. Cl. .......................... 283/94; 283/81; 283/101; 283/103; 283/106; 428/40.1; 428/42.1

(58) Field of Classification Search .................. 283/81, 283/94, 98, 101, 106; 428/40.1, 41.7, 42.1-3; 156/90

See application file for complete search history.

(56) References Cited

U.S. PATENT DOCUMENTS 1,943,538 A * 1/1934 Kahn ...................... 229/87.05
3,890,192 A 6/1975 Vite
3,896,246 A * 7/1975 Brady, Jr. .................. 428/42.2
4,188,250 A 2/1980 Grass (Continued)

OTHER PUBLICATIONS

Smyth Companies, Inc. Internet information accessed Jul. 23, 2001. http://www.smythco.com/package/wrapandahalf.html.

*Primary Examiner*—Monica Carter
*Assistant Examiner*—Pradeep Battula
(74) *Attorney, Agent, or Firm*—Nikolai & Mersereau, P.A.; C. G. Mersereau

(57) ABSTRACT

An extended text wrap label includes a base ply and at least one top ply. The base ply has a first lengthwise dimension, a first widthwise dimension, a top surface that is capable of bearing graphic images, and a bottom surface that is capable of bearing graphic images and capable of being adhesively coupled to an object to be labeled. The at least one top ply has a second lengthwise dimension, a second widthwise dimension, a front surface that is capable of bearing graphic images, and a back surface that is also capable of bearing graphic images. The base ply and the at least one top ply are adhesively coupled, in a first portion of the label, to each other such that the top surface of the base ply and the back surface of the at least one top ply are in contiguous juxtaposition with each other along the first lengthwise dimension and the second lengthwise dimension, respectively, and along the first widthwise dimension and the second widthwise dimension, respectively. Also, the base ply and the at least one top ply are, in a second portion of the label, resealably coupled to each other.

52 Claims, 9 Drawing Sheets

U.S. PATENT DOCUMENTS

| | | | | |
|---|---|---|---|---|
| 4,188,251 | A | | 2/1980 | Grass |
| 4,188,427 | A | | 2/1980 | Grass |
| 4,324,058 | A | | 4/1982 | Sherwick et al. |
| 4,473,429 | A | | 9/1984 | Crankshaw |
| 4,727,667 | A | | 3/1988 | Ingle |
| 4,745,014 | A | * | 5/1988 | Hanaya et al. ............ 428/34.9 |
| 4,759,454 | A | | 7/1988 | Nowicki et al. |
| 4,849,043 | A | | 7/1989 | Instance |
| 4,890,862 | A | * | 1/1990 | Buchholz .................... 283/62 |
| 5,254,302 | A | * | 10/1993 | Yamanaka ................. 264/129 |
| 5,264,265 | A | | 11/1993 | Kaufmann |
| 5,342,093 | A | | 8/1994 | Weernink |
| 5,389,415 | A | | 2/1995 | Kaufmann |
| 5,443,668 | A | | 8/1995 | Zaborney et al. |
| 5,568,898 | A | | 10/1996 | Gelardi et al. |
| 5,588,239 | A | * | 12/1996 | Anderson ................... 40/630 |
| 5,672,224 | A | * | 9/1997 | Kaufmann ................. 156/257 |
| 5,716,688 | A | * | 2/1998 | Burke et al. ................. 428/43 |
| 5,827,913 | A | * | 10/1998 | Baetzold et al. ........... 523/210 |
| 6,073,377 | A | | 6/2000 | Mehta |
| 6,155,322 | A | | 12/2000 | Landan et al. |
| 6,332,631 | B1 | | 12/2001 | Kirk |
| 6,755,442 | B2 | * | 6/2004 | Franko et al. ............... 283/94 |
| 2004/0258868 | A1 | * | 12/2004 | Franko, Sr. ............... 428/40.1 |

* cited by examiner

10

300

EXTENDED TEXT WRAP LABEL AND METHOD OF MANUFACTURE THEREOF

The present application is a continuation-in-part of application Ser. No. 09/927,989, filed Aug. 10, 2001, now U.S. Pat. No. 6,755,442 B2, issued Jun. 29, 2004, the entirety of which is incorporated herein by reference.

BACKGROUND OF THE INVENTION

I. Field of the Invention

The present invention relates generally to labels. The invention relates specifically to an extended text wrap label that may be used with existing roll-fed wrap labeling machines for application to containers and like objects.

II. Related Art

In the printing arts, and in particular in the commercial printed label art for labeling and decorating consumer products, there exists a continual demand for labels and decorations which not only appeal to consumers, but also bear ever increasing amounts of printed information. For example, labels for identification of consumer health care and pharmaceutical products are often required by governmental regulations to describe in painstaking detail their compositions and ingredients. As new food and drug laws are passed, regulations require the inclusion of increasing amounts of label information.

One label that has gained wide popularity is a so-called "wrap" label. A wrap label commonly utilizes a continuous label substrate or base ply comprising paper, or a clear or opaque film such as polypropylene, or a combination of paper and film. The base ply is usually rectangular, as defined by a desired label width associated with a widthwise dimension and a desired label length associated with a lengthwise dimension (transverse to the widthwise dimension). The base ply also has, of course, opposing first and second ends, along with front and back surfaces. Desired graphics are typically printed on the front surface of the base ply, and may also be printed on the back surface. In application of the wrap label to a commonly cylindrical container, a widthwise portion of the back surface of the base ply at the first end thereof is adhered to the object to be labeled, by means of an adhesive. The base ply, having been adhesively secured to the container at the first end, is then wrapped around the container and is adhesively secured to the container at the second end of the base ply adjacent to the first end. The length of the base ply is usually chosen to nearly match a circumference of the container, to minimize unnecessary overlap of the opposing ends of the label substrate applied to the container. The application of the wrap label to the container may be carried out by any suitable roll-fed label applicator, such as are available, for example, from Krones A. G. of Regensburg, Germany, and from B&H Labeling Systems of Ceres, Calif., U.S.A.

In general in the labeling and packaging arts, various forms of so-called "extended text" labels have been proposed to provide increased printed information on labels. One such extended text label type that has gained wide popularity is the booklet type label, where a base ply is joined to a top ply via an adhesive coupling or "hinge" between the two plies. An example of this type of label is disclosed in U.S. Pat. No. 5,264,265 issued to Kaufmann, entitled "PEEL-BACK RE-SEALABLE MULTI-PLY LABEL".

Attempts have been made to provide an extended-text wrap label. For example, U.S. Pat. No. 4,727,667 issued to Ingle, entitled "EXTENDED WRAP AROUND LABELS", discloses a pressure sensitive adhesive label that is of a sufficient length (i.e., greater than a circumference of a container to which it is to be applied) so that it may be wrapped around an exterior surface of the container and overlap itself. A portion of the overlapping label is provided with lacquer or ink to facilitate adhesive release therebetween.

In U.S. Pat. No. 5,342,093 issued to Weernink, entitled "WRAP AROUND LABEL", a label includes first, central, and second portions sequentially lengthwise along a single label ply. The first and central portions together have a length that is substantially equal to an outer circumference of a container to be labeled. The second portion has a length that is substantially equal to the first portion. When the label is adhered to the container, the second portion of the single ply overlaps the first portion.

In U.S. Pat. No. 6,073,377 issued to Mehta, entitled "OVER-WRAP LABEL", a label substrate is provided having first and second ends, and first and second major surfaces. A length of the substrate is chosen so that the second end thereof may extend around a container to which the label is being applied, over the first major surface, and overlap the first end. A combination of an adhesive and a release agent is utilized so that the second end is releasably securable to the second major surface.

Also, Smyth Companies, Inc. discloses its WRAP AND A HALF™ product (http://www.smythco.com/package/wrapandahalf.html) as a typical cut label used on cans and bottles that is simply a longer printed label. A length of the Smyth label product may be chosen to extend 10-100% beyond a circumference of a container to be labeled.

Labels such as those disclosed above, however, cannot be successfully utilized with typical roll-fed wrap labeling machines used by customers buying such labels and applying them to their product containers, packaging, and like objects to be labeled. Specifically, the disclosed labels require, relative to roll-fed label application machines, that extensive and complex tooling changes be made to account for the longer, overlapping label ply lengths resulting in longer "repeats" as known in the art. Additionally, the disclosed labels often require multiple adhesive and release coating depositions, resulting in longer label fabrication and application times. Further, the known labels have been commonly required to be constructed from relatively expensive pressure-sensitive web materials.

Therefore, there exists a need for an extended text wrap label that does not require modification by customers of their existing roll-fed wrap labeling machines, and does not require significant changes to materials and adhesive specifications. There also exists a need for such a wrap label that may be constructed from relatively inexpensive film and paper web materials.

Wrap labels of the class of the present invention described herein are labels manufactured for application by purchasers using conventional roll-fed wrap labeling machines. They are produced without any adhesive material on the bottom surface of the base ply. The labels are sold and supplied on a web in roll form without the need for any liner or release layer associated with the bottom surface. The labels belong to a class of labels also commonly referred to by those in the art as "roll-fed" labels.

At the point of application to containers of interest, a continuous roll of labels is introduced to a purchaser's high-speed label application machine which cuts the roll into a series of individual labels and applies them sequentially to a series of product containers or other objects to be labeled. Any adhesive used to apply the labels to the containers of interest is supplied by the labeling machine at the time of application and is generally applied to adhere the leading and trailing edge portions of the bottom surface of the base ply of the labels; and the individual labels are thereafter typically "wiped onto" corresponding containers with their base plies fixed as desired.

It is generally accepted and well-known in the label making arts that in-line printing and converting processes offer the most cost-effective label production. An exemplary in-line method is disclosed in U.S. Pat. No. 4,849,043 issued to Instance, entitled "METHOD OF PRODUCING LABELS".

Therefore, there also exists a need for an in-line converting and printing process for manufacture of such extended text wrap labels.

SUMMARY OF THE INVENTION

A feature of the present invention is the provision of extended text roll-fed, wrap labels that are inexpensive and simple to produce.

Another feature of the present invention is extended text roll-fed, wrap labels that do not require modification of existing roll-fed wrap labeling machines for application of the labels to an object to be labeled.

A further feature of the present invention is the provision of an in-line converting and printing process to manufacture such labels.

In accordance with one embodiment of the present invention, extended text roll-fed, wrap labels are provided that include a base ply and at least one top ply. The term "top ply", as used herein, refers to any ply above the base ply in the label structures of which there may be more than one. The base ply has a first lengthwise dimension, a first widthwise dimension, a top surface that is capable of bearing graphic images, and an adhesive-free bottom surface that is also capable of bearing graphic images and capable of being adhesively coupled to an object to be labeled using separately supplied adhesive. The at least one top ply has a second lengthwise dimension, a second widthwise dimension, a front surface that is capable of bearing graphic images, and a back surface that is also capable of bearing graphic images. The base ply and the at least one top ply are adhesively coupled, in a first portion of the label, to each other such that the top surface of the base ply and the back surface of the at least one top ply are in contiguous juxtaposition with each other along the first lengthwise dimension and the second lengthwise dimension, respectively, and along the first widthwise dimension and the second widthwise dimension, respectively. Also, the base ply and the at least one top ply are, in a second portion of the label, releasably, resealably coupled to each other. As indicated above, manufactured and prior to being applied to an object of interest to be labeled, the bottom surface of the base ply is uncoated and adhesive free. In this state, it can then be supplied as a continuous web in roll form without any need for a release ply or "liner" to a conventional roll-fed wrap labeling machine at the time of use.

In accordance with an important aspect of another embodiment of the invention, the base ply is wider than any top plies, extending beyond the top ply, or plies, with reference to the width direction. The width of the labels is generally the dimension perpendicular to the length of the roll-fed web; and top and bottom margins are with reference to the orientation of graphic images on the label and the normal orientation of the container of interest to which a label is to be applied as illustrated in the figures. The amount that the base ply extends beyond the top ply or plies, as used herein, is defined as a top or bottom margin and a label may have a top margin, a bottom margin or both top and bottom margins so that the base ply can accommodate shoulder portions of the object to be labeled at the top or bottom, or both top and bottom of objects of interest to be labeled. Such may be the case, for example, with aerosol cans or other containers having generally cylindrical shapes or other shapes with constant circumferences, with upper or lower extremities of increasing or decreasing circumference.

In addition, top plies may be fixed in stacked sequence to other lower top plies, or to a base ply by adhesive extending along the width of both ends thereof and a tear-away strip provided across each associated top ply therebetween. Removal of the tear-away strip provides an openable or booklet-type free end to an associated top ply. The free end of the associated top ply, or plies, may be made, and is preferably provided with, a release-reseal system, as will be further described, between it and the base ply or other top ply so that it may be opened to a hinge and resealed.

DETAILED DESCRIPTION

Figure 1:
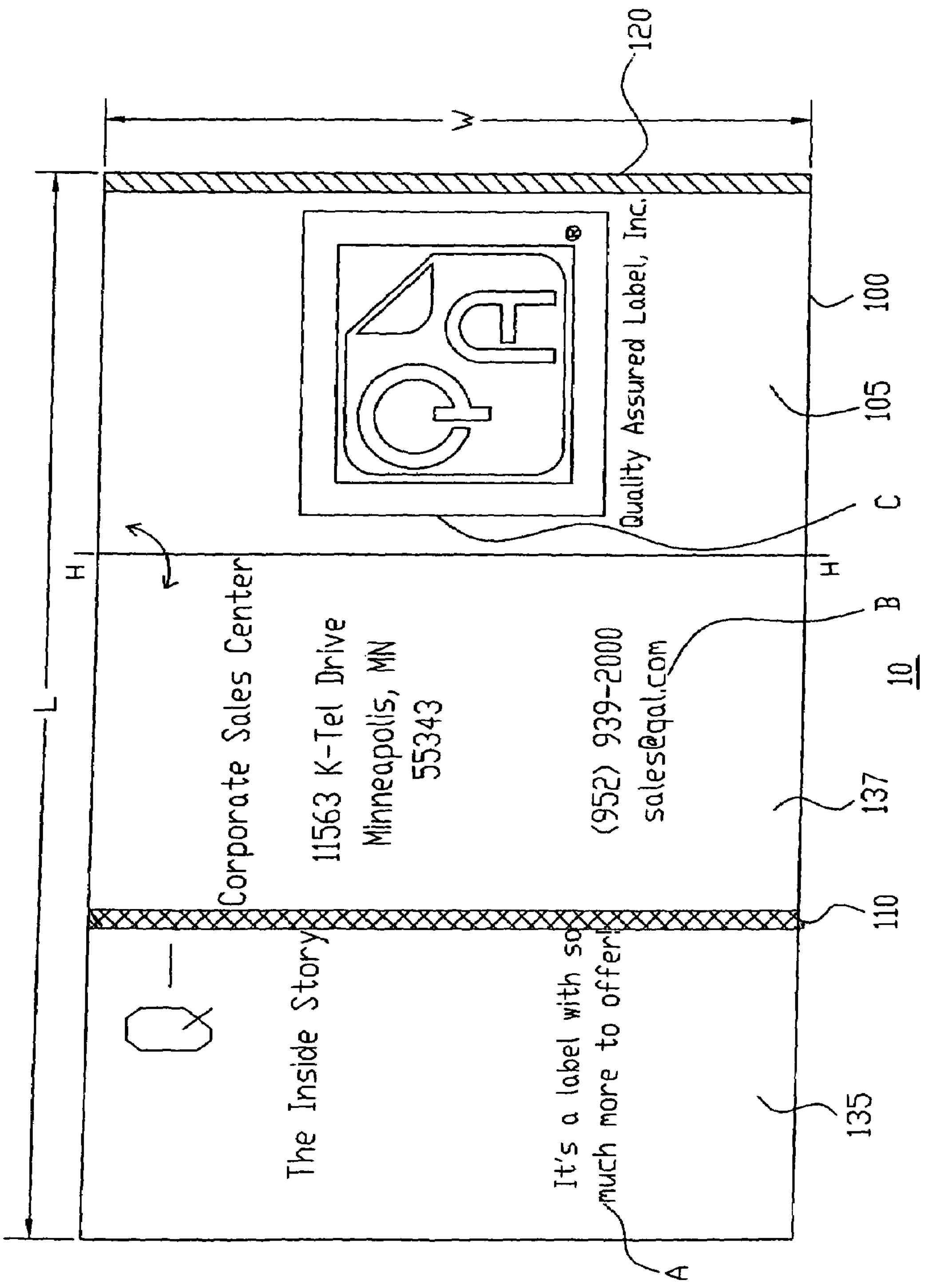
FIG. 1 is an illustration of an extended text wrap label, constructed in accordance with an embodiment of the present invention.
Figure 2:
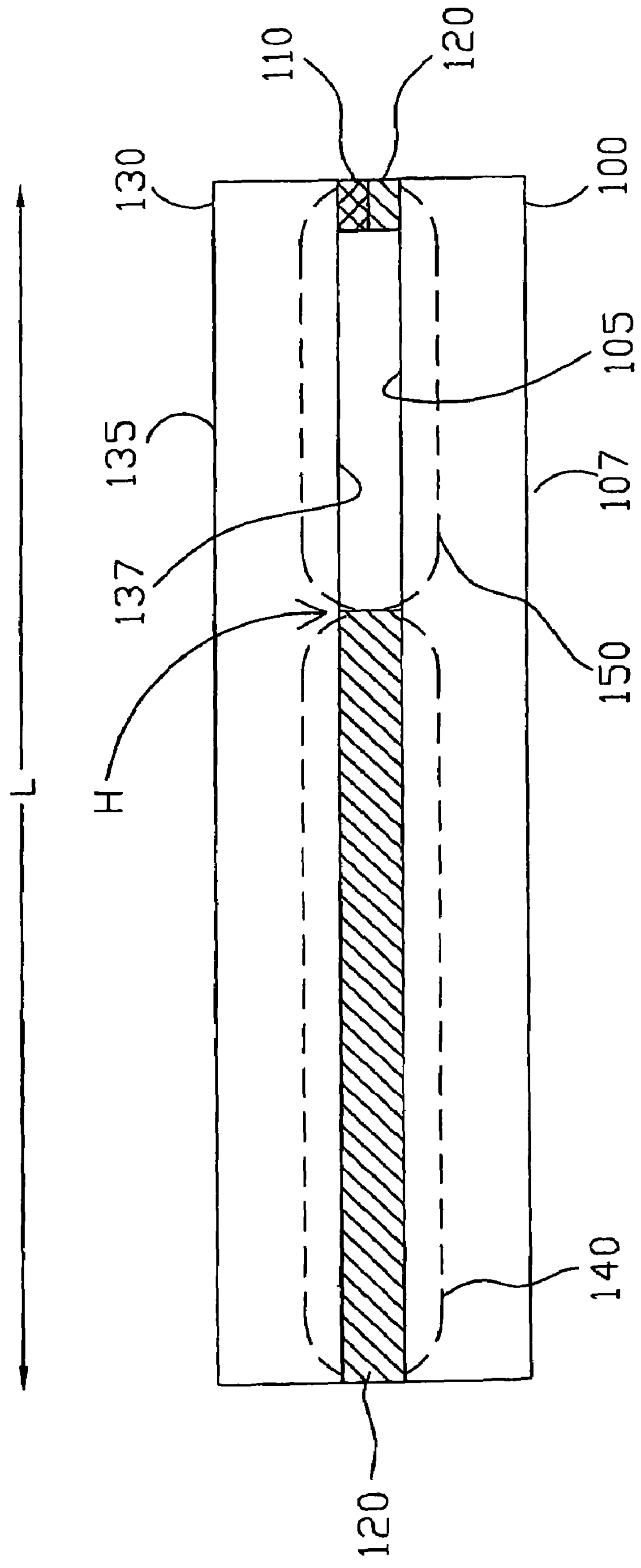
FIG. 2 is a magnified cross-sectional view of the label of FIG. 1.

Referring to FIGS. 1 and 2, there shown are plan and cross-sectional views, respectively, of an extended text wrap label 10. It is to be noted that FIG. 1 depicts label 10 in use, or opened, while FIG. 2 depicts a closed condition.

In the two figures, label 10 includes a base ply 100 having a top surface 105 and a bottom surface 107, a release coating 110, and an adhesive coating 120. Label 10 further includes a top ply 130 having a front surface 135 and a back surface 137, a coupled portion 140, and a partially uncoupled portion 150. Label 10 may further include a tab means 160 (as will be described with reference to FIG. 4).

Base ply 100 and top ply 130 are preferably any commercially available web-like film materials that are capable of use in an in-line printing and converting process (as will be further described relative to manufacture of label 10). Such a film material may be, for example, polypropylene (e.g., Part No. 350WHPL from AET Films of Terre Haute, Ind.). As used herein, however, "web-like film materials" denotes any suitable label material, including paper, film, polypropylene, polyethylene, polyester, polyvinylchloride, polystyrene, foil, and ethylene vinyl acetate. Preferably, base ply 100 and top ply 130 each has a thickness in a range of about 0.5 mil. to 6.0 mil.

Figure 3:
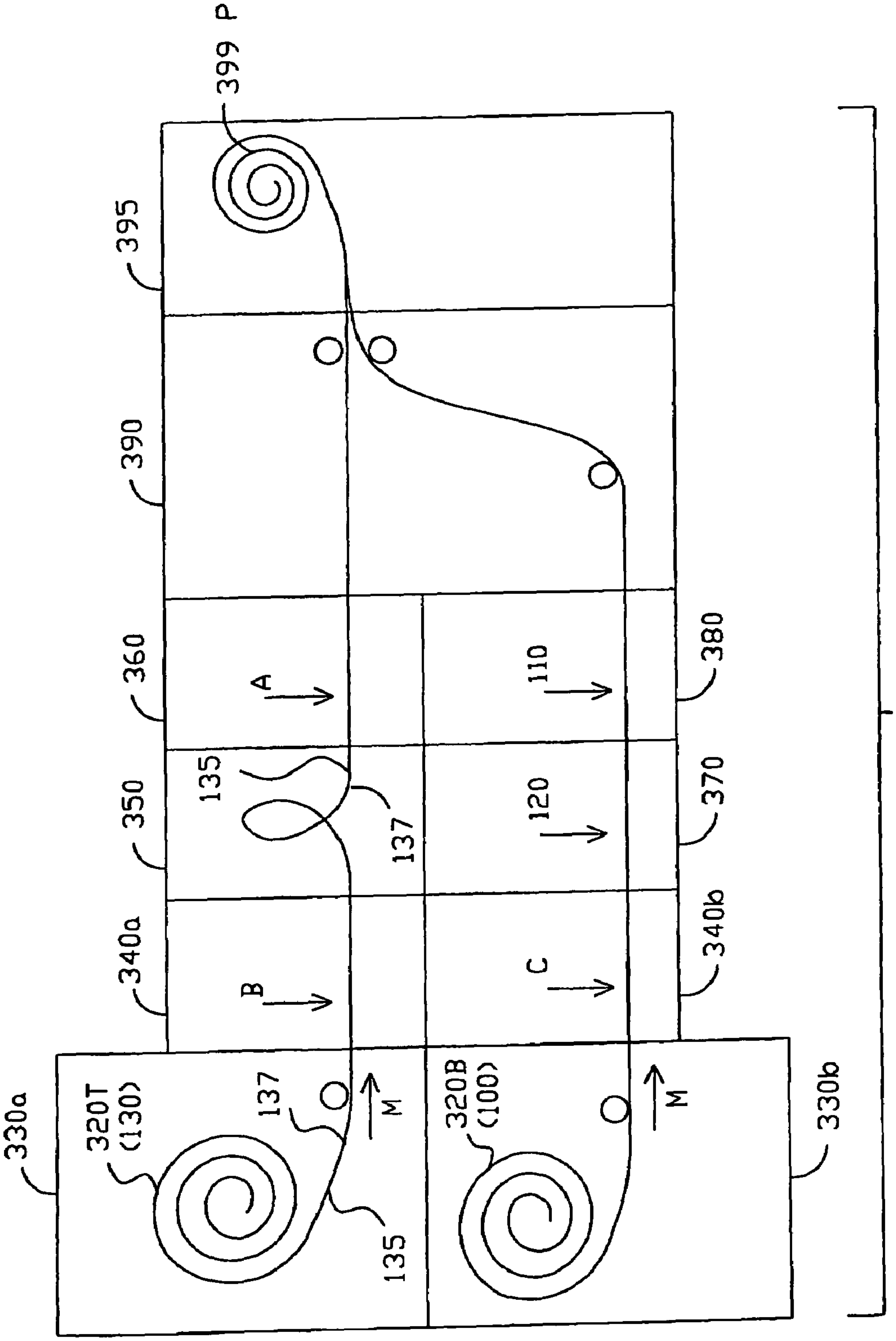
FIG. 3 is a schematic diagram of a manufacturing method for production of labels of the present invention.

Top surface 105 of base ply 100 is capable of bearing printed graphics thereon, as indicated in FIGS. 1 and 3 by reference character C; although not illustrated, bottom surface 107 is also capable of bearing printed graphics thereon. Likewise, both front surface 135 and back surface 137 of top ply 130 are capable of bearing printed graphics as indicated by characters A and B.

In construction of label 10, and with particular reference to FIG. 2, coupled portion 140 and partially uncoupled portion 150 are defined by selected applications of release coating 110 and adhesive coating 120 to top ply 130 and base ply 100, respectively. Specifically, adhesive coating 120 is applied to selected portions of top surface 105 of base ply 100, in coupled portion 140 and partially uncoupled portion 150 as shown in the figure. Release coating 110 is applied, in turn, to a selected portion of back surface 137 in partially uncoupled portion 150, substantially contiguous with adhesive coating 120 therein. It is to be understood that adhesive coating 120 provided in coupled portion 140 acts to securely bond together, substantially, top ply 130 and base ply 100; conversely, in uncoupled portion 150, release coating 110 in combination with adhesive coating 120 acts to releasably-resealably bond ply 130 and ply 100. This releasable bond in uncoupled portion 150 allows label 10 to be opened so that graphics B and C may be viewed (as shown in FIG. 1). It is also to be appreciated that release coating 110, although depicted in FIG. 2 as having been applied to only a relatively small area of top ply 130 in uncoupled portion 150, may be, if desired for ease of application, applied entirely across back surface 137 in uncoupled portion 150.

Coatings 110 and 120 are preferably chosen from water-based, solvent-based, ultraviolet light activated, and hot melt coatings as are commercially available Craig Adhesives & Coatings Co. of Newark, N.J., and Northwest Coatings Corp. of Oak Creek, Wis. Adhesive coating 120 is chosen to provide secure bonding between base ply 100 and top ply 130 in coupled region 140. Release coating 110 is chosen with respect to and in combination with adhesive coating 120, to provide ease of opening and resealability of label 10 in uncoupled portion 150.

Referring again to both FIGS. 1 and 2, it is to be particularly understood that coupled portion 140 adjacent to uncoupled portion 150 in label 10, forms a so-called "hinge" (about axis H-H in FIG. 1). The hinge about axis H-H facilitates opening and closing of label 10 in use, in booklet fashion.

It is also to be understood that the extended text roll-fed, wrap label 10 of the present invention provides extended text in booklet fashion without employing an "overwrap" ply (as disclosed in the aforementioned patents). That is, label 10 utilizes a multi-ply format (base ply 100 and top ply 130) in contiguous juxtaposition with each other, as shown in the figures. Thus, it is to be particularly appreciated and understood that label 10 does not increase an overall end-to-end label length, so that customers' existing roll-fed wrap labeling machines for applying the wrap label to the container may be used without time-consuming and costly modifications. Further, as will be described below, fabrication of label 10 in an in-line process will be relatively faster than fabrication of existing overwrap ply labels because such overwrap labels inherently use relatively longer material lengths which results in smaller finished label yields.

With attention, now, to FIG. 3, there depicted in schematic fashion is an exemplary in-line web press manufacturing installation 300 including multi-unit in-line printing and converting press 310, for mass production of label 10.

Multi-unit press 310 of installation 300 includes unwind units 330*a* and 330*b*, first and second printing units 340*a* and 340*b*, a web turning unit 350, a third printing unit 360, a first coating unit 370, a second coating unit 380, a nip roller web joining unit 390, and a final rewind unit 395, as will now each be further described in construction of a web of labels 10.

It is to be understood that press 310 is selectively capable of providing a variable number of print stations for application and drying of pigmented inks, coatings, and adhesives. As understood by those of ordinary skill in the printing arts, the exemplary multi-unit press 310 may be any suitable narrow- or wide-web press such as a flexographic, letterpress, gravure, screen, or offset press. Such presses are commercially available from, for example, Comco International of Milford, Ohio, or Mark Andy Inc. of St. Louis, Mo.

To begin the construction of labels 10, an unsupported film web 320T (top ply 130 in FIG. 2) is supplied in a conventional roll form to press 310 at unwind unit 330*a*, and in a lengthwise machine direction M thereto. Simultaneously, an unsupported film web 320B (base ply 100 in FIG. 2) is also preferably supplied in a conventional roll form to press 310 at unwind unit 330*b* in lengthwise machine direction M. Film webs 320T and 320B are any suitable in-line web material (e.g., the aforementioned AET Films material).

Unwind units 330*a-b* pass webs 320T-B, respectively, to first printing units 340*a* and 340*b*, respectively, where printed graphics B and C (as depicted in FIG. 1) are, respectively, printed on back surface 137 of top ply 130 and on top surface 105 of base ply 100.

Web 320B bearing graphics C is then passed to first coating unit 370, where adhesive coating 120 is selectively applied thereto (as depicted in FIG. 2). Web 320B then passes to second coating unit 380, where release coating 110 is applied thereto (also as depicted in FIG. 2).

While web 320B is being processed as aforedescribed, web 320T is simultaneously passed to web turning unit 350, where web 320T is turned over. The turning of web 320T may be provided by, for example, a turn-bar technique as is known in the art. Additionally, web 320T is then passed to third printing unit 360, where printed graphics A (as depicted in FIG. 1) are printed on front surface 135 of top ply 130.

Webs 320T and 320B then pass from units 360 and 380, respectively, to nip roller web joining unit 390. At unit 390, webs 320T-B are adhesively joined by way of adhesive coating 120. Referring also to FIG. 2, this adhesive joining of webs 320T-B forms the aforementioned coupled portion 140 which acts to permanently bond together, substantially, top ply 130 and base ply 100. Adhesive coating 120 also provides, in combination with release coating 110, the aforementioned releasable bond between ply 130 and ply 100 in uncoupled portion 150 of label 10.

Figure 4:
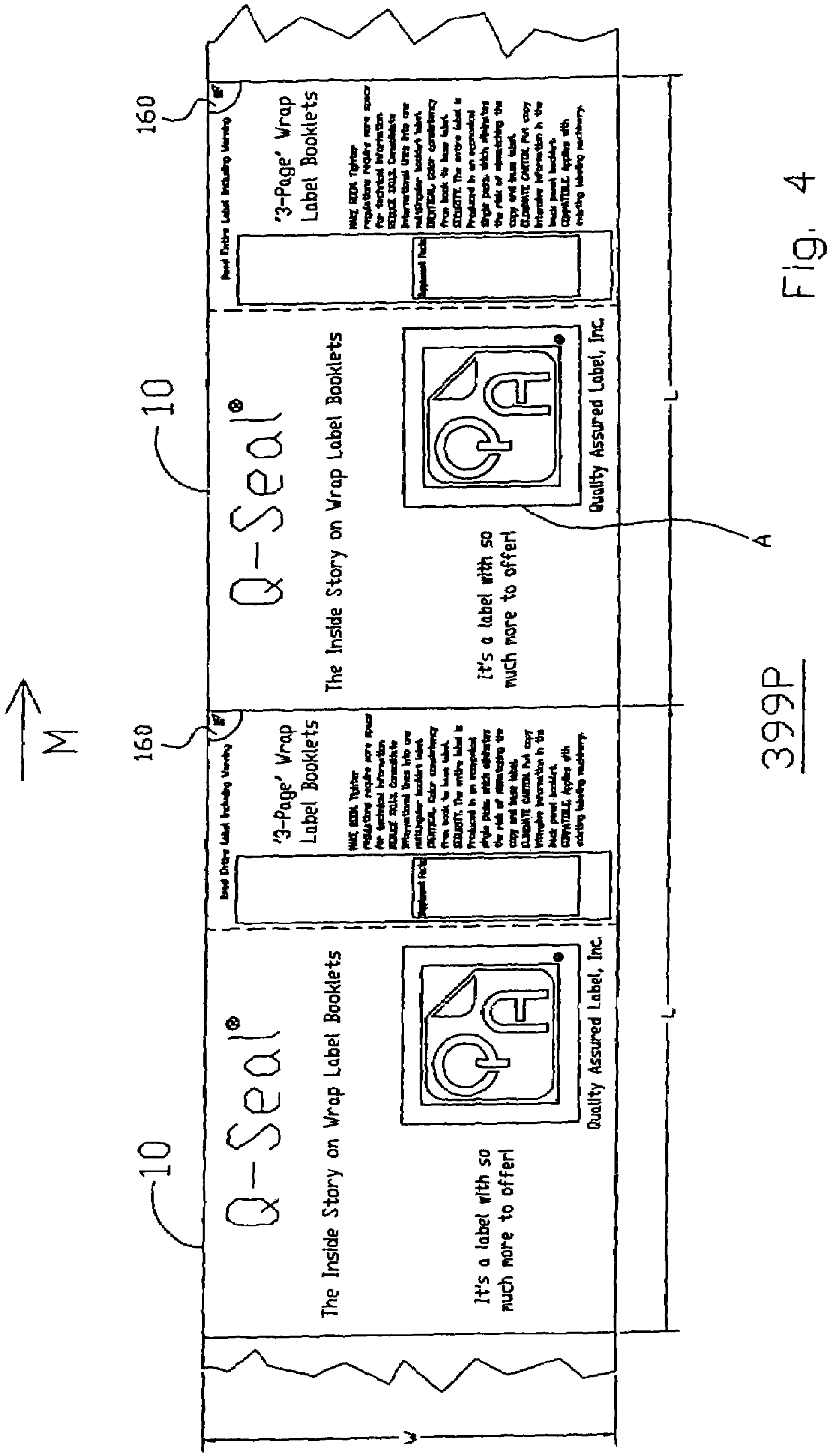
FIG. 4 is a plan view of a web of labels as shown individually in FIG. 1, produced in the method of FIG. 3.

Adhesively joined webs 320T-B then pass to final rewind unit 395 where the combined webs are re-wound into a supply roll of a finished product 399P carrying individual labels 10 (as additionally shown in FIG. 4). Finished product 399P is then made available to a customer for use in the customer's roll-fed wrap labeling machines. The supply roll of finished product 399P contains only the combined webs as no release ply or other separate layer is required owing to the dry adhesive-free bottom surface of the base ply.

The labels described in accordance with the above embodiment, have particularly utility in labeling containers that have a regular shape, which may be cylindrical, or another shape, which is of constant circumference from top to bottom. Many containers, however, have coved or rounded top and bottom shoulder-type tapers which also must be accommodated.

Figure 5:
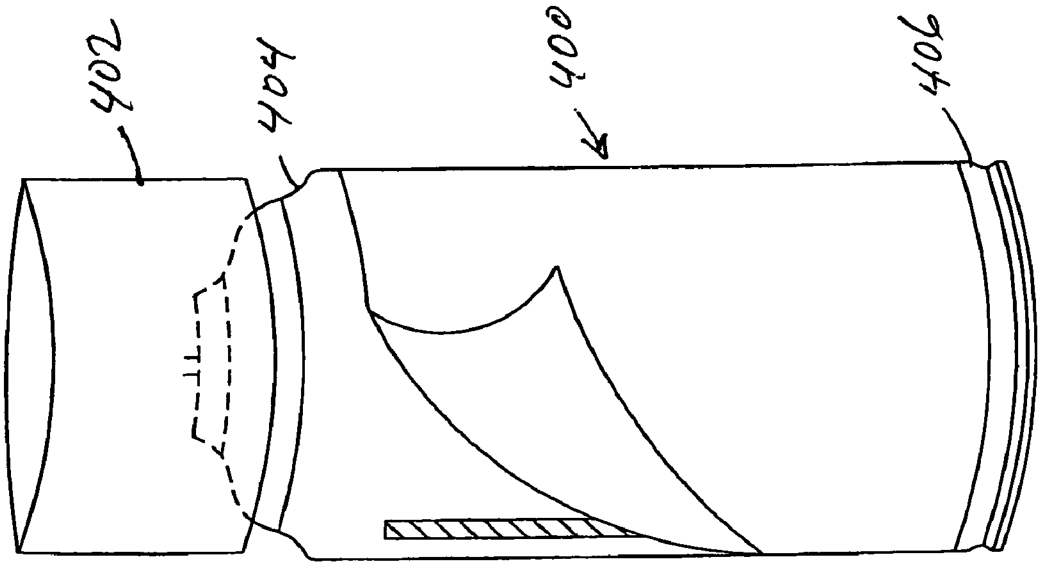
FIG. 5 depicts an aerosol container with its cap partially removed, labeled using a label in accordance with an alternate embodiment of the labels of the invention.
Figure 6A:
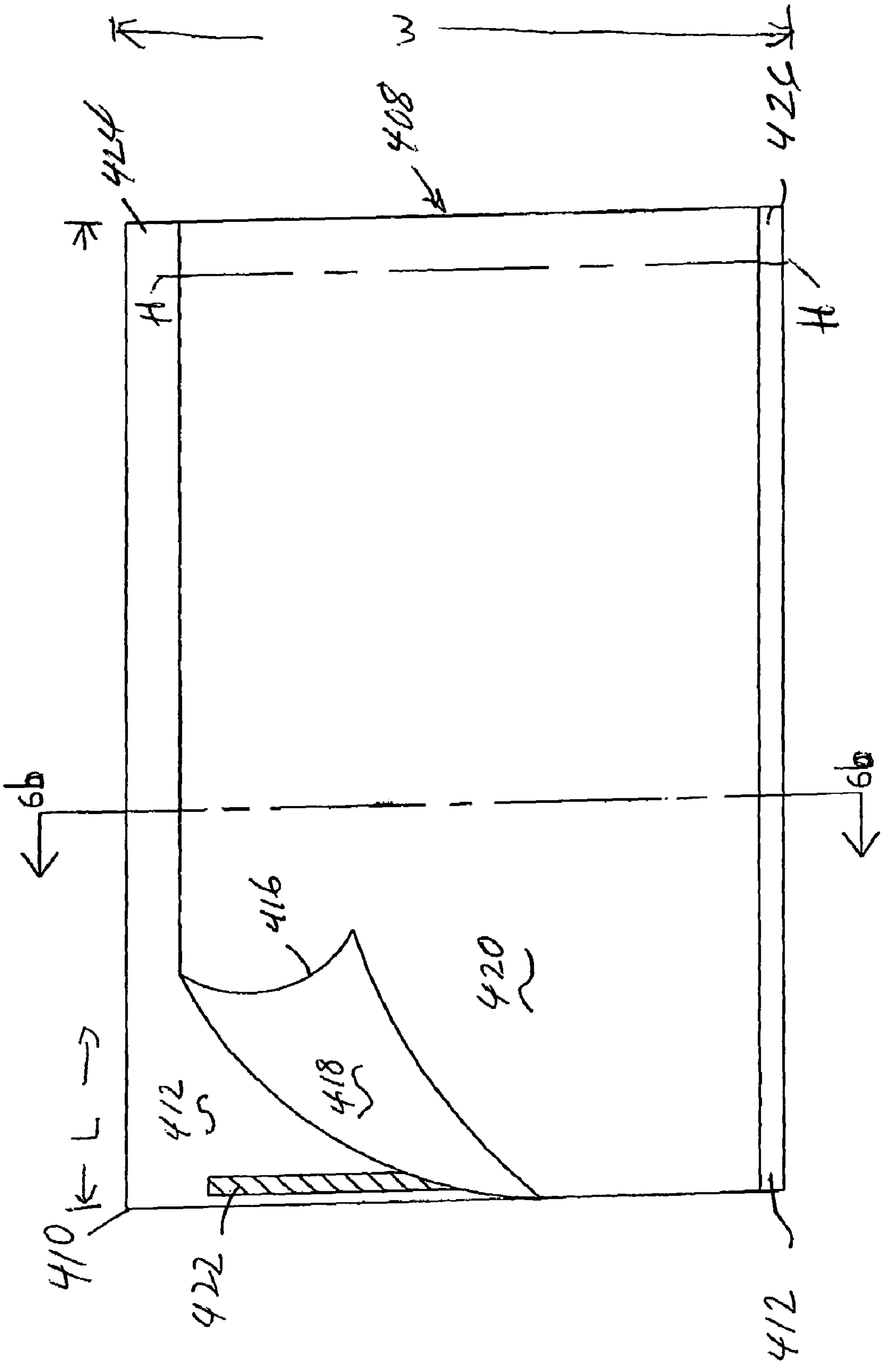
FIG. 6*a* is a top view of the label of FIG. 5.
Figure 6B:
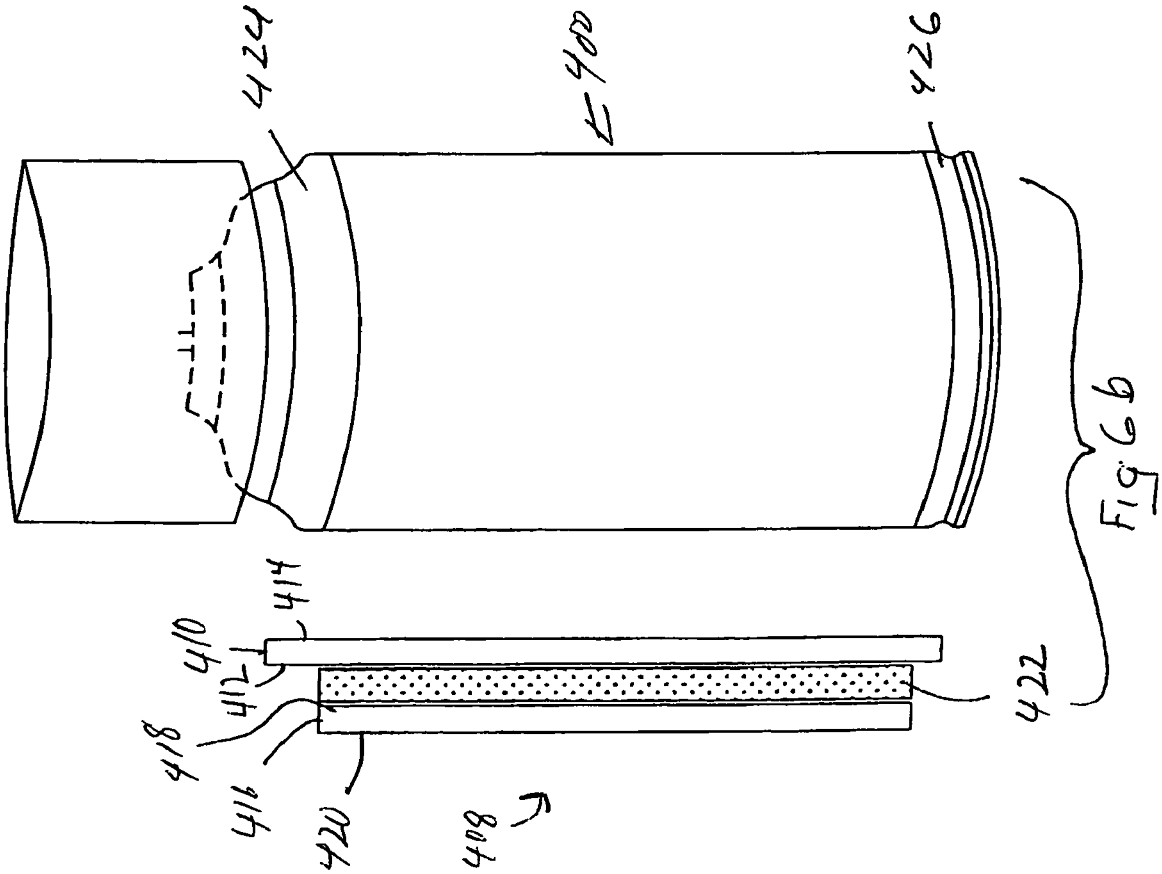
FIG. 6*b* is a sectional view taken substantially along 6*b*-6*b* of FIG. 6*a* and shown in relation to a labeled aerosol container.

FIGS. 5 and 6*b* depict a generally cylindrical aerosol-type can 400 having a removable, replaceable lid 402. The aerosol can has a generally coved upper shoulder portion 404 and a lower rounded shoulder portion at 406. The container 400 is accommodated by an alternate embodiment label 408, a multi-layer label of the present invention. With particular reference to FIGS. 6*a*-6*b*, label 408 includes a base ply 410 having a top surface 412 and a bottom surface 414. Label 408 further includes a top ply 416 having a back surface 418 and a front surface 420. A release-reseal system is shown at 422. The construction of the label 408 is quite similar to that with reference to label 10 shown in FIGS. 1-3 with the label opening to a so-called hinge (about H-H) shown in FIG. 6*a*. The hinge about axis H-H facilitates opening and closing of the label 408 in use, in booklet fashion.

As seen in the figures, label 408 differs from label 10 in that the base ply 410 is generally wider than the top ply 416. For example, in FIG. 6*a*, there is shown a top margin 424 and a bottom margin 426 in ply 410 which extend beyond the width dimension of ply 416, while the plies are generally the same length. FIG. 6*b* further shows the label 408 applied to the container 400 in a sealed or unopened condition, with the upper margin 424 conforming to the cove shape 404 of the aerosol container 400 and the lower margin 426 conforming to the lower shoulder 406 of the aerosol container 400. Note that the upper ply 416 is of a width that is accommodated by that portion of the container which is provided with a constant circumference.

Figure 7:
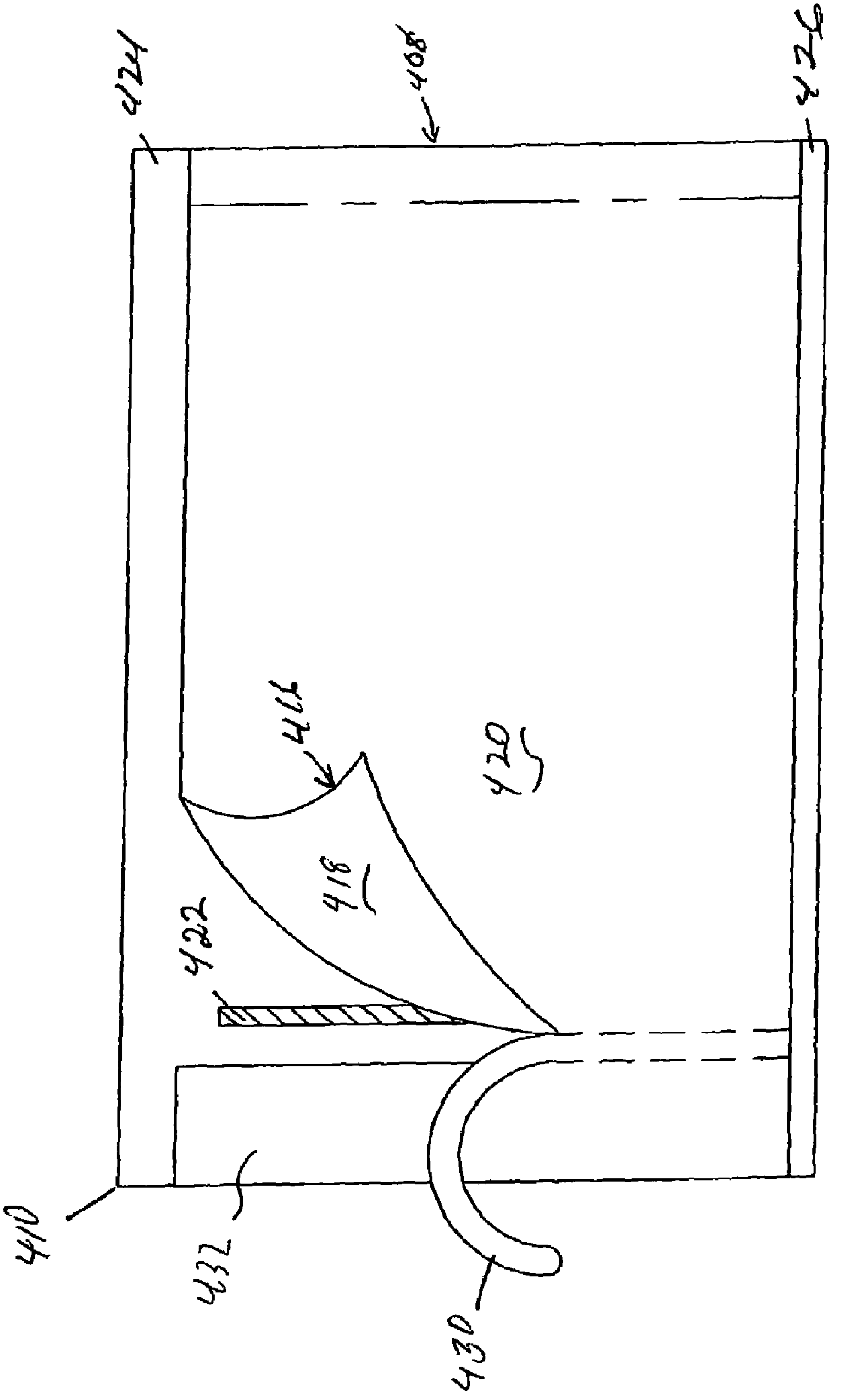
FIG. 7 is a top view of another embodiment of the labels of the invention.

FIG. 7 depicts a label embodiment similar to that shown in FIGS. 5-6*a* and 6*b* except that the top ply 416 is further provided with a tear-away opening strip 430 which is used to separate parts of the upper ply 416 in which segment 432 remains adhered to the base layer 410 leaving ply 416 with a free end.

Figure 8:
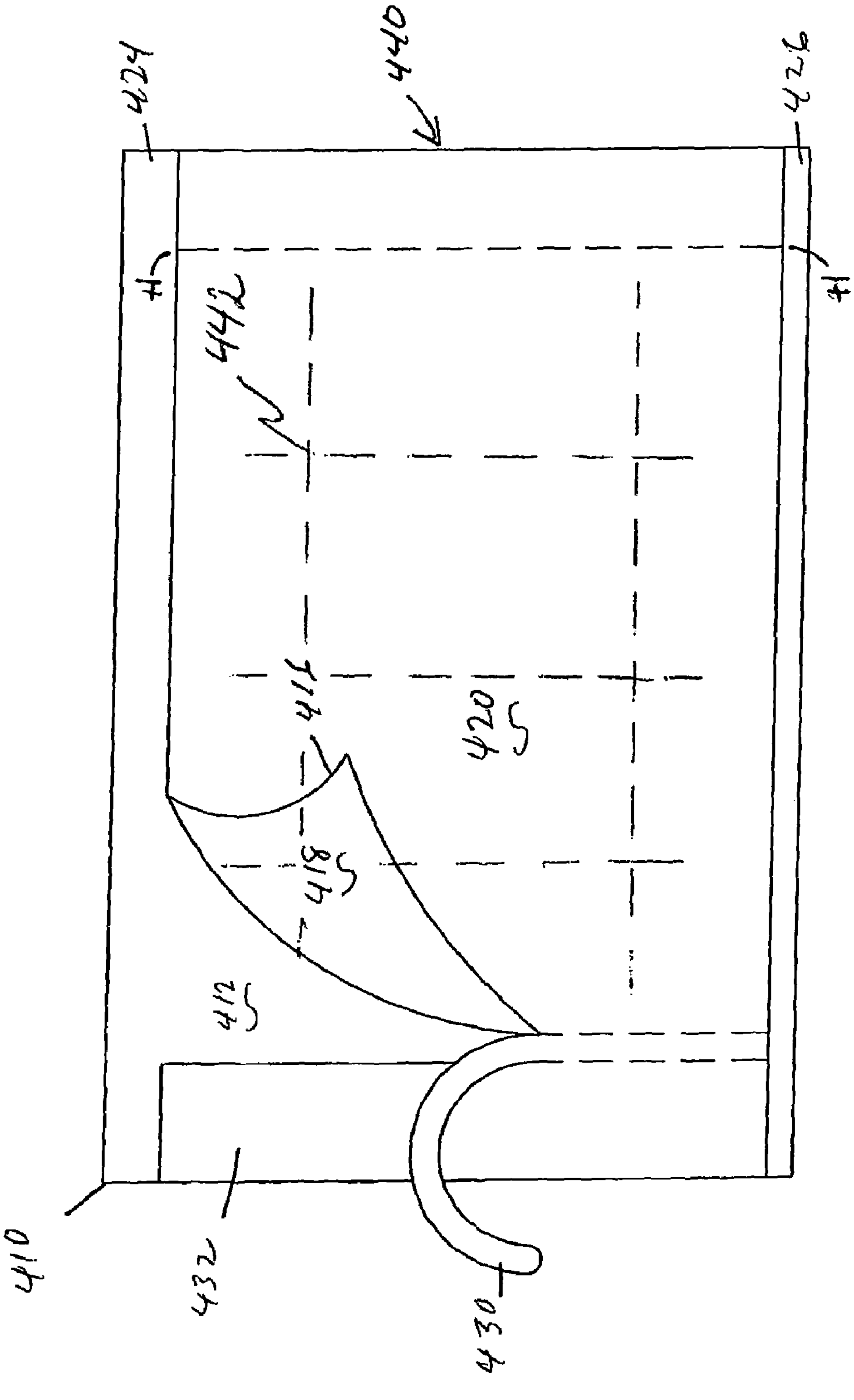
FIG. 8 depicts yet another embodiment of the labels of the invention.

FIG. 8 depicts a label embodiment 440 which is similar to embodiment 408 without the release-reseal system 422, and the hinge H-H is shown as a perforated arrangement such that the free portion of ply 416 can be removed entirely as a coupon, a proof-of-purchase tear-off tab or other document useful when separated from the attached label. A lattice work, shown in phantom at 442, depicts a possible pattern for additional release adhesive which may optionally be added to hold the unbonded portion of the ply 416 in place during label processing and web rolling. The lattice of adhesive 442 is used primarily when the rolls of finished labels are to be large and many-layered so that the portion of the top ply between fixed ends will lie flat and true through application to a container of interest to be labeled.

The surfaces 412 and 414 of base ply 410 and 418 and 420 of top ply 416 can selectively carry graphics in the same manner as that of label 10 and the web processing can be the same. It should further be noted that bottom ply 410 can include a web material having heat shrinkable characteristics which enable the margins 424 and 426 to conform and adhere to the reduced circumference dimensions of the shoulders and coves of a container of interest to be labeled. Such materials include, but are not limited to those that exhibit desired stretch and shrinkage characteristics such as are obtainable from the aforementioned AET Films. Such materials are known to those skilled in the art.

With respect to adhesives, the release-reseal systems of the labels of the present invention are processed with pressure sensitive adhesives, i.e., adhesives which remain tacky (sticky) throughout their useful lives and the life of the corresponding label. Of course, the degree of tackiness of the material can be modified as by the use of release coatings, etc., described below, to adjust the degree of adherence of the release-reseal systems. The hinges or other so-called permanently or securely adhered or bonded areas of the labels of the invention are preferably characterized by adhesives that are non-pressure sensitive. Although they are viscous and tacky when applied, they undergo a phase change in curing which renders them in a dry, non-tacky state in the finished label with the plies securely bonded. Some relevant adhesives are shown in the examples of Table I below:

| | CHARACTERISTICS | |
|---|---|---|
| Type of Adhesives | Pressure Sensitive Adhesives of this Type | Non-Pressure Sensitive Adhesives of this Type (i.e., "glues") |
| Hot Melt Adhesives | Remain "tacky" in final state (e.g., duct tape). | Non-tacky or dry in final state (e.g., craft sticks) |
| Solvent-based Adhesives | Remain "tacky" in final state (e.g., electrical tape). | Non-tacky or dry in final state (e.g., model airplane glue). |
| Water-based Adhesives | Remain "tacky" in final state (e.g., POST-IT ® brand notes, adhesive bandages and masking tape). | Non-tacky or dry in final state (e.g., Elmer's ® brand glue). |
| UV-curable Adhesives | Remain "tacky" in final state. | Non-tacky or dry in final state (e.g., automobile construction). |
| EB-curable Adhesives | Remain "tacky" in final state. | Non-tacky or dry in final state (e.g., floor laminates). |

As can be seen from the table, the various types of adhesives listed in the left-hand column can be made in either pressure sensitive or non-pressure sensitive forms. All of the pressure sensitive forms remain in a viscous "tacky" phase in the final state, i.e., the manufactured product; whereas, the non-pressure sensitive adhesives undergo a phase change and become non-tacky or dry in the final state or in the finished label. With respect to these adhesives, a reference that is very well known to those skilled in the art, *The Concise Encyclopedia of Polymer Science and Engineering* (New York, 1990.), makes a clear distinction between non-pressure sensitive adhesives and pressure sensitive adhesives.

Adhesion of pressure sensitive materials may be modified (reduced) by detackifying overlayers, or by using low-adhesion abutting surfaces, but the material does not change phases and solidify. Generally, bonds between layers made using pressure-sensitive adhesives can be pulled apart without damage to the layers whereas those made using non-pressure sensitive adhesives cannot. This is particularly true with respect to applicant's paper multi-ply or booklet labels.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired similar results, or that various accessories may be added thereto.

For example, top plies 130 and 416 could comprise multiple plies, to form a multi-page booklet-type extended text wrap label.

Also, of course, the depiction of an aerosol spray can in the figures is only exemplary, and is not meant to be limiting.

It is to be appreciated that any of the aforedescribed coatings and graphics may be selectively provided in any suitable combination on labels 10, 408 or 440, for a particular use thereof. For example, back surface 137 or 418 of top ply 130 or 416 could receive coatings 110 and 120 thereon (as described relative to top surface 105 of base ply 100).

It is to be understood that any suitable alternatives may be employed to provide the extended text wrap label of the present invention, along with its manufacturing scheme.

Lastly, the choice, of course, of compositions, sizes, and strengths of various aforementioned components of extended text wrap label 10 are all a matter of design choice depending upon intended uses of the present invention.

Accordingly, these and other various changes or modifications in form and detail of the present invention may also be made therein, again without departing from the true spirit and scope of the invention as defined by the appended claims.

What is claimed is:

1. An extended text rollfed label for application with separately supplied adhesive to an object to be labeled using a roll-fed wrap labeling machine, said label comprising:

(a) a base ply having a length and a width, top surface and a bottom surface, said bottom surface of said base ply being adhesive-free;

(b) at least one top ply having at a length and a width, a front surface and a back surface, overlaying said base ply and having a fixed end and a free end wherein said base ply is wider than said top ply and extends beyond said top ply a width direction thereby creating at least a top or bottom extended base margin portion;

(C) a first adhered portion including an amount of adhesive joining a portion of said base ply and the fixed end of said at least one top ply and thereby forming a hinge therebetween;

(d) a second adhered portion including an amount of adhesive spaced from said hinge for releasably, resealably coupling said free end of said at least one top ply and said base ply; and (e) a generally adhesive-free portion between said first and said second adhered portions.

2. A label as in claim 1 wherein said base ply extends beyond said top ply to create both top and bottom base margin portions.

3. A label as in claim 2 wherein said extended base portion is designed to accommodate both top and bottom curved shoulder portions of an object of interest to be labeled.

4. A label as in claim 3 wherein said object of interest to be labeled is an aerosol can.

5. A label as in claim 2 wherein said top surface of said base ply and all surfaces of said at least one top ply carry graphic images thereon.

6. A label as in claim 2 wherein said base ply includes a heat-shrinkable material.

7. A label as in claim 2 wherein said base ply and said at least one top ply are adhesively bonded to each other in said first adhered portion by means of an adhesive coating which undergoes a phase change upon curing and becomes a non-tacky solid.

8. A label as in claim 7 wherein said adhesive bonding said base ply and said at least one top ply in said first adhered portion is selected from the group consisting of water-based adhesives, solventbased adhesives ultraviolet light activated adhesives and hot melt adhesives.

9. A label as in claim 7 wherein said base ply and said at least one top ply are releasably, resealably coupled to each other in said second adhered portion by a pressure-sensitive adhesive.

10. A label as in claim 2 wherein said adhesive bonding said base ply and said at least one top ply in said first adhered portion is selected from the group consisting of waterbased adhesives, solventbased adhesives ultraviolet light activated adhesives and hot melt adhesives.

11. A label as in claim 2 wherein said base ply and said at least one top ply are releasably, resealably coupled to each other in said second adhered portion by a pressure-sensitive adhesive.

12. A label as in claim 11 wherein said pressure sensitive adhesive is selected from the group consisting of waterbased adhesives, solventbased coating, ultraviolet light activated coatings and hot melt coatings.

13. A label as in claim 2 further comprising at least one tab means provided on said front surface of said at least one top ply for promoting uncoupling of said at least one top ply from said base ply at said free end.

14. A label as in claim 2 wherein the label is part of a continuous roll of such labels.

15. A label as in claim 1 wherein said extended base portion is designed to accommodate at least a top or bottom curved shoulder portion of an object of interest to be labeled.

16. A label as in claim 15 wherein said object of interest to be labeled is an aerosol can.

17. A label as in claim 1 wherein said second adhered portion comprises a narrow strip at the free end of said top ply.

18. A label as in claim 17 wherein said second adhered portion includes a release coating.

19. A label as in claim 1 wherein said top surface of said base ply and all surfaces of said at least one top ply carry graphic images thereon.

20. A label as in claim 1 further comprising a tear-away strip associated with releasing said free end of said at least one top ply.

21. A label as in claim 2 further comprising a tearaway strip associated with releasing said free end of said at least one top ply.

22. A label as in claim 1 wherein said base ply and said at least one top ply are selected from the group consisting of paper, film, polypropylene, polyethylene, polyester, polyvinylchloride, polystyrene, foil and ethylenevinylacetate.

23. A label as in claim 1 wherein said base ply includes a heat-shrinkable material.

24. A label as in claim 1 wherein said base ply and said at least one top ply are adhesively bonded to each other in said first adhered portion by means of an adhesive coating which undergoes a phase change upon curing and becomes a non-tacky solid.

25. A label as in claim 24 wherein said adhesive bonding, said base ply and said at least one top ply in said first adhered portion is selected from the group consisting of water based adhesives, solvent based adhesives, ultraviolet light activated adhesives and hot melt adhesives.

26. A label as in claim 24 wherein said base ply and said at least one top ply are releasably, resealably coupled to each other in said second adhered portion by a pressure-sensitive adhesive.

27. A label as in claim 1 wherein said adhesive bonding., said base ply and said at least one top ply in said first adhered portion is selected from the group consisting of water based adhesives, solvent based adhesives, ultraviolet light activated adhesives and hot melt adhesives.

28. A label as in claim 1 wherein said base ply and said at least one top ply are releasably, resealably coupled to each other in said second adhered portion by a pressure-sensitive adhesive.

29. A label as in claim 28 wherein said pressure sensitive adhesive is selected from the group consisting of waterbased adhesives, solventbased coating, ultraviolet light activated coatings and hot melt coatings.

30. A label as in claim 1 further comprising at least one tab means provided on said front surface of said at least one top ply for promoting uncoupling of said at least one top ply from said base ply at said free end.

31. A label as in claim 1 wherein the label is part of a continuous roll of such labels.

32. A label as in claim 1 further comprising a pattern of retaining adhesive between said first adhered portion and said second adhered portion for releasably retaining said at least one top ply to said base ply in said generally adhesive-free portion.

33. A label as in claim 32 wherein said pattern is a lattice pattern.

34. An extended text roll-fed label for application with separately supplied adhesive to an object of interests to be labeled using a roll-fed wrap labeling machine, said label comprising:

(a) a base ply having a length and a width, a top surface and a bottom surface, said bottom surface of said base ply being adhesive-free;

(b) at least one top ply having a length and a width, a front surface and a back surface, overlaying said base ply;

(c) a pair of adhered portions including an amount of a first adhesive joining, and fixing together, end portions of said base ply with end portions of said at least one top ply; and (d) a removable tear-away strip in said at least one top ply, toward one end thereof and extending across the width thereof in a selected portion, the removal of which creates a free end and enables an associated upper ply to open to one of said adhered portion located farthest from said tear-away strip which thereby forms a hinge.

35. A label as in claim 34 wherein said base ply is wider than said top ply and extends beyond said top ply in at least a width direction thereby creating at least a top or bottom extended base margin portion.

36. A label as in claim 35 wherein said base ply extends beyond said top ply to create both top and bottom extended base margin portions.

37. A label as in claim 36 including a second adhered portion that includes an amount of a second adhesive spaced from said hinge for releasably, resealably coupling said free end of said at least one top ply near said tear-away strip.

38. A label as in claim 35 including a second adhered portion that includes an amount of a second adhesive spaced from said hinge for releasably, resealably coupling said free end of said at least one top ply near said tear-away strip.

39. A label as in claim 35 wherein said top surface of said base ply and all surfaces of said at least one top ply carry graphic images thereon.

40. A label as in claim 35 further comprising a pattern of a retaining adhesive between said hinge and said tearaway strip for releasably retaining said at least one top ply to said base ply between said end portions.

41. A label as in claim 34 including a second adhered portion that includes an amount of a second adhesive spaced from said hinge for releasably, resealably coupling said free end of said at least one top ply near the location of said tear-away strip.

42. A label as in claim 41 wherein said second adhesive is a pressure sensitive adhesive.

43. A label as in claim 42 wherein said second adhered portion includes a release coating.

44. A label as in claim 43 wherein said top surface of said base ply and all surfaces of said at least one top ply carry graphic images thereon.

45. A label as in claim 34 wherein said first adhesive is a non-pressure sensitive adhesive.

46. A label as in claim 45 wherein said second adhesive is a pressure sensitive adhesive.

47. A label as in claim 46 wherein said second adhered portion includes a release coating.

48. A label as in claim 34 wherein said top surface of said base ply and all surfaces of said at least one top ply carry graphic images thereon.

49. A label as in claim 34 further comprising a pattern of a retaining adhesive between said hinge and said tear-away strip for releasably retaining said at least one top ply to said base ply between said end portions.

50. A label as in claim 49 wherein said pattern is a lattice pattern.

51. A label as in claim 49 wherein said retaining adhesive is a pressure sensitive adhesive.

52. A label as in claim 49 further comprising a release coating associated with said retaining adhesive.

* * * * *